Patented Sept. 4, 1928.

1,682,914

UNITED STATES PATENT OFFICE.

FRANK E. LAYMAN AND LINWOOD T. RICHARDSON, OF MILWAUKEE, AND OSCAR A. CHERRY, OF WAUWATOSA, WISCONSIN, ASSIGNORS TO THE CUTLER-HAMMER MFG. CO., OF MILWAUKEE, WISCONSIN, A CORPORATION OF WISCONSIN.

METHOD OF MOLDING PLASTIC BODIES.

No Drawing. Application filed September 13, 1923. Serial No. 662,560.

This invention relates to molded plastic bodies or articles, also to materials and processes for production thereof.

Heretofore have been developed and utilized industrially certain cementitious or resinous substances containing as an important constituent sulphur or an equivalent and produced by treatment, including chemical reaction, of materials comprising on the one hand certain of the organic bodies or compounds such as a phenol, naphthalene or the like and on the other hand a substance or substances such as a chloride of sulphur or the like capable of furnishing sulphur or another element of the sulphur type.

Such resins (which are herein called resins of the sulphur type) usually when incorporated with certain of the known filler materials, are in general well adapted to cold molding followed by strong and preferably prolonged heat treatment as a result of which the formed material is transformed from a plastic to an indurated state.

However, as a result of plasticity at ordinary temperatures and other characteristics, such resins as heretofore produced and treated, have not been in general well adapted to production of hard and permanent shapes or bodies by hot molding treatment which does not involve strong and relatively prolonged heat induration of the formed body, shape or piece.

The present invention has among its objects that of providing for production or modification of such resins in ways such as to adapt the same to molding treatment by methods other than those heretofore applied to such resins.

Another and more specific object is that of providing advantageous methods of so producing or modifying such resins and subsequently treating the same for production of commercially useful shapes or bodies by hot molding, without requiring subsequent heat induration of the formed piece.

Another object is that of providing resins of the sulphur type adapted to such treatment.

Another object is that of providing commercially useful shapes or bodies comprising such resins.

Other objects and advantages will hereinafter appear.

As a result of extensive experimentation, it has been found that, by processes involving a limited degree of preinduration, resins of the sulphur type may be so produced or modified as to adapt the same in conjunction with suitable fillers, to set hard when cold, without any material degree of heat induration in the ordinary sense either concurrently with or subsequently to the form giving treatment. Moreover, the aforementioned preinduration and other treatments may be so effected and controlled as to maintain adequate thermoplasticity of the material to adapt the same to molding under moderate conditions of temperature and mechanical pressure.

The treatments for production or modification of the various resins of the sulphur type to adapt the same to production of useful articles, as herein contemplated, may be effected in different ways dependent largely upon the constitution, consistency and other characteristics of a particular resin and may moreover be to some extent varied for individual resins.

Such treatments may comprise variation in the proportion and manner of compounding of the ingredients or constituents of the resin and in the treatment of the resin during and subsequent to production thereof. Also the character of the ingredient or constituent substances of the resin may be varied for present purposes. Thus, variation in quantity of the sulphur furnishing constituents of the resins has been found to influence the characteristics of the product very materially. Again, it has been found possible, as by employment of different sulphur containing substances in production or treatment of a single resin to vary and control the hardness, thermoplacticity, and other characteristics of the resin. Further, control and modification of the resin may in given cases be secured through regulation of the temperature, time and other factors of the reaction for production and treatment of the resin.

As exemplary of the herein contemplated processes; a phenolic resin of the sulphur type adapted to cold molding, e. g., one produced from approximately 100 parts of a phenol and 140 parts of a chloride of sulphur and melting at about 140° F. may be melted and heated to approximately 175° F. and to each 175 parts thereof may be added from 50 to 75 parts of sulphur monochloride, the heating being preferably continued and being so regulated as to maintain the temperature of the reaction mixture above the melting temperature thereof.

Following progress of the reaction to substantial completion the resultant modified or preindurated resin has a melting temperature between 195° and 215° F. Moreover, the resin treated as described, possesses adequate hardness and other desirable properties at ordinary temperatures, having moreover sufficient thermoplasticity to enable molding thereof under moderate conditions of heat and pressure.

35 to 45 parts of this resin, in pulverized form, may be thoroughly mixed and blended with 60 parts of a suitable filler material such, for example, as wood flour, ground mica, rotten stone, clay or the like and may thereafter be quick molded at a temperature of 275° to 300° F. in heated dies from which the formed body may be quickly ejected without material heat induration either concurrent with or subsequent to the form giving treatments. Cooling of the dies and of the formed material is desirable as an aid in ejection of the latter from the former and also in order to expedite setting of the formed body.

As a variant of the foregoing, the aforedescribed binder and filler materials may be mixed and incorporated with one another by means of heated rolls or the like and may be thereafter further heated as upon a steam table or the like prior to hot pressing thereof as aforedescribed.

The aforedescribed resin may be produced directly by originally utilizing substantially the proportions of the constituents which are ultimately employed in production of the modified or tempered resin, whereas the proportions and other factors may be varied as required for production of a preindurated resin having the particular properties desired.

As a further example, a cold molding resin of the sulphur type melting at approximately 120° F. and produced from 100 parts of naphthalene and approximately 75 parts of a chloride of sulphur, in the presence of a suitable catalytic or activating agent such as a small quantity of iron, may have added thereto while heated approximately 60 parts of sulphur monochloride and be otherwise treated substantially as indicated in the preceding example for production of a modified or preindurated resin melting at about 220° F. and adapted in conjunction with a filler to quick molding while heated and without induration, as aforedescribed.

This preindurated resin may also be produced directly from suitable proportions of its ingredients or constituents and may also be controlled and varied as to melting point and other characteristics as in the case of the phenolic resins aforedescribed.

As an additional example; a preindurated resin adapted to the uses aforedescribed may be produced directly from 100 parts naphthalene, about 125 parts of a chloride of sulphur, approximately 150 parts of sulphur or its equivalent and about 2 parts of iron or other suitable activating agent.

In practice the sulphur, naphthalene and iron are preferably heated together, with stirring, to a temperature of about 125° F., the mass being then of a more or less pasty consistency. Thereafter a portion, such as one-third of the chloride of sulphur is added and permitted to react. After subsidence of such reaction the remainder of the chloride of sulphur is added in separate portions, as for example, three, each portion being similarly permitted to react to subsidence before addition of a subsequent portion. During such later additions of the chloride of sulphur the temperature of the reaction mixture is preferably maintained above the melting temperature thereof, that is to say, for example, between 200° and 250° F.

Preindurated resins produced as last described are characterized by marked thermoplasticity throughout an extended range of temperatures and hence are peculiarly adapted to molding in accordance with the methods aforedescribed, particularly when incorporated with suitable fillers in about the proportion of 40 to 50 parts of binder to 60 parts of filler.

Moreover, by suitable additional or advanced preinduration treatment which may include heating at, for example, 400° to 450° F. for a period which may cover an hour or longer the hardness of the resin when cold may be very greatly increased while maintaining adequate thermoplasticity to enable hot molding under moderate conditions of temperature and pressure.

Corresponding resins wherein napthalene is replaced by a phenol without a specific activating agent may be produced and utilized by methods wholly analogous to the foregoing. Also, in either case, the treatment may be varied by adding sulphur or its equivalent to the inorganic constituents of the resin, or to the completed resin, preferably while in melted condition.

By treatments of which the foregoing are exemplary, the aforedescribed resins of the sulphur type, and many others falling under such characterization, may be produced with or without subsequent modification, the final thermoplastic products being in such predeterminable states or stages of preinduration as to adapt the same to hot molding, without further induration, for production of many types of commercially useful shapes or bodies.

What we claim as new and desire to secure by Letters Patent is:

1. The process of producing a resin adapted to production of commercially useful shapes, which comprises subjecting a cold molding resin, produced from a reaction mixture of materials whose major constituents are an organic body and a chloride of sulphur, to pre-induration treatment including addition to about 175 parts of said resin about 50 to 75 parts of sulphur monchloride, raising the melting temperature of the supplemented resin to about 195 to 220 degrees F., and then subjecting said resin to quick hot molding treatment.

2. The process which comprises effecting reaction of only an organic body and a chloride of sulphur in the presence of a suitable catalytic or activating agent to produce a resin adapted for cold molding, subjecting said resin to pre-induration treatment including addition to about 175 parts thereof about 50 to 75 parts of sulphur monochloride, heating the supplemented resin to effect reaction of the ingredients whereby the melting temperature thereof is raised to about 195 to 220 degrees F., then subjecting the supplemented resin to quick hot molding treatment, and allowing the molded articles to harden by cooling.

3. The process of producing a thermoplastic molded product, which comprises effecting reaction of a mixture of materials consisting substantially entirely of a phenolic body and a chloride of sulphur in predetermined proportions to provide a resin having a melting temperature of 195 to 220 degrees F., mixing with the resin a suitable filler, subjecting the mixture to quick hot molding treatment at a temperature of 275 to 300 degrees F., and allowing the molded articles to harden by cooling.

4. The process of producing a thermoplastic molded product, which comprises effecting reaction of a mixture of materials consisting substantially entirely of a phenolic body and a chloride of sulphur in predetermined proportions to provide a cold molding resin having a melting temperature of about 140 degrees F., mixing with about 175 parts of said resin about 50 to 75 parts of a chloride of sulphur, heating the mixture above the melting temperature thereof to effect reaction of the ingredients, discontinuing the application of heat when the melting temperature of the reaction mixture is about 195 to 220 degrees F., and then subjecting the mixture to quick hot molding at a temperature of 275 to 300 degrees F., while maintaining latent thermoplasticity of the molded product.

5. The process of treating a cold molding phenol-sulphur chloride resin produced from about 100 parts of phenol and 140 parts of a chloride of sulphur and melting at about 140 degrees F., which comprises melting and heating said resin to a temperature of about 175 degrees F., mixing with about 175 parts of the resin about 50 to 75 parts of sulphur monochloride, heating the mixture above the melting temperature to effect substantially complete reaction of the ingredients whereby a resin having a melting temperature of about 195 to 220 degrees F. is provided, mixing with 35 to 45 parts of said resin about 60 parts of a filler material, subjecting the mixture to quick hot molding treatment at a temperature of 275 to 300 degrees F., and allowing the molded articles to harden by cooling.

In witness whereof, we have hereunto subscribed our names.

FRANK E. LAYMAN.
LINWOOD T. RICHARDSON.
OSCAR A. CHERRY.